United States Patent [19]

Hoffmann

[11] Patent Number: 5,010,649
[45] Date of Patent: Apr. 30, 1991

[54] CUTTERHEAD FOR A VEGETATION CUTTER APPARATUS

[75] Inventor: Joachim Hoffmann, Aichwald, Fed. Rep. of Germany

[73] Assignee: Andreas Stihl, Waiblingen, Fed. Rep. of Germany

[21] Appl. No.: 522,782

[22] Filed: May 14, 1990

[30] Foreign Application Priority Data

May 20, 1989 [DE] Fed. Rep. of Germany ........ 3916525

[51] Int. Cl.$^5$ ............................................. A01D 50/00
[52] U.S. Cl. ........................................ 30/276; 30/347
[58] Field of Search .................................. 30/276, 347

[56] References Cited

U.S. PATENT DOCUMENTS

| | | | |
|---|---|---|---|
| 4,236,312 | 12/1980 | Foster et al. | 30/276 |
| 4,352,243 | 10/1982 | Lombard | 30/276 |
| 4,366,622 | 1/1983 | Lombard | 30/276 |
| 4,607,431 | 8/1986 | Gay | 30/276 |
| 4,897,923 | 2/1990 | Collins | 30/276 |
| 4,926,557 | 5/1990 | Haupt | 30/276 |

Primary Examiner—Z. R. Bilinsky
Attorney, Agent, or Firm—Walter Ottesen

[57] ABSTRACT

The invention is directed to a cutterhead for a rotatably-driven vegetation cutter apparatus defining a drive axis about which the cutterhead is rotatably driven. The cutterhead includes a housing adpated to be rotatably driven by the vegetation cutter apparatus about the drive axis and a spool carrying a flexible cutting filament wound thereon with the spool being rotatably journalled in the housing. An indexing device permits an incremental rotation of the spool relative to the housing to pay out incremental lengths of the cutting filament. The indexing device includes a blocking lever pivotally journalled in the housing. The blocking lever has a first lever arm having a switching arm formed thereon and a second lever arm has a redirecting element formed thereon for guiding the cutting filament over the blocking lever. The blocking lever is mounted in the housing so as to be movable between a blocking position wherein the switching arm coacts in dependence upon centrifugal force with switching cams to prevent a rotational movement of the spool with respect to the housing and a release position wherein the switching arm coacts in dependence upon centrifugal force with the switching cams to release the spool for movement relative to the housing to pay out an incremental length of the filament. The switching arm and the redirecting element are spaced at a peripheral distance from each other so as to cause the first lever arm to be longer than the second lever arm.

10 Claims, 4 Drawing Sheets

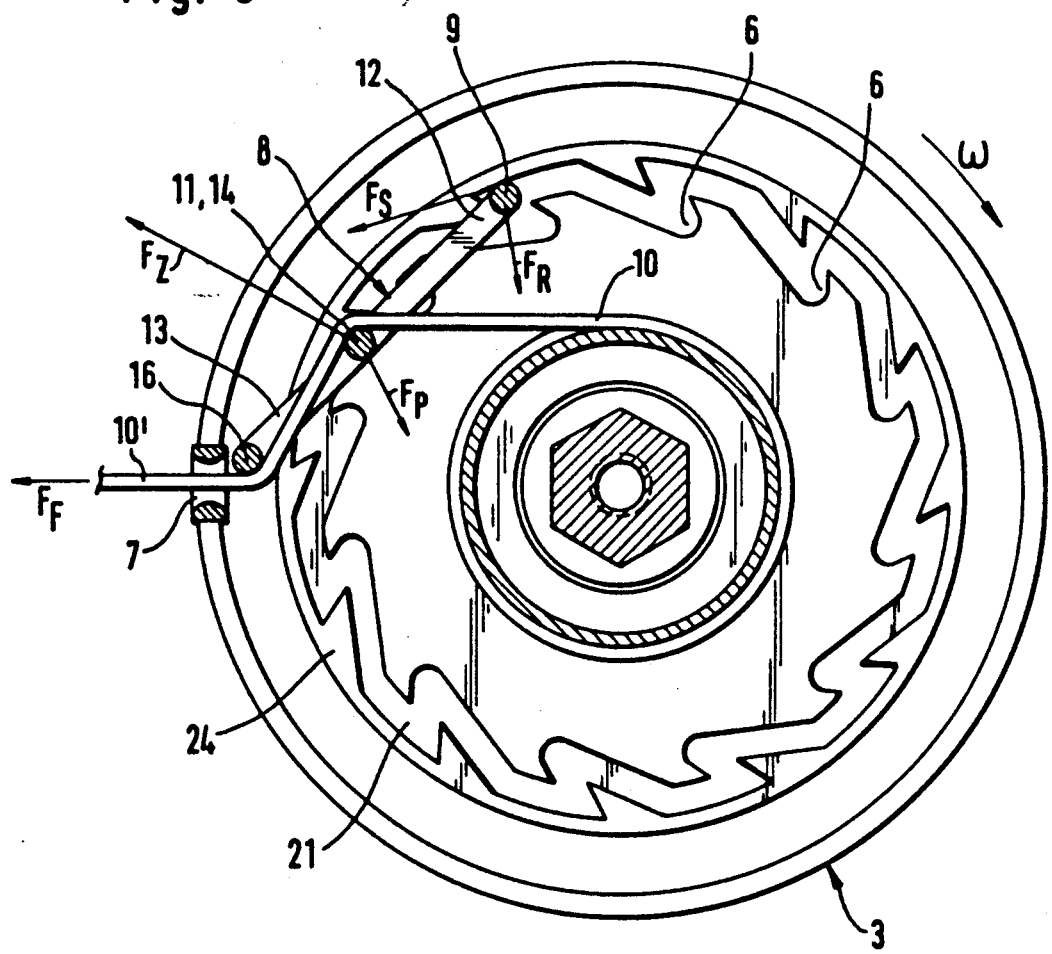

CUTTERHEAD FOR A VEGETATION CUTTER APPARATUS

FIELD OF THE INVENTION

The invention relates to a rotatably driven cutterhead for a vegetation cutter apparatus having a housing. The cutterhead includes a spool which is rotatable about a hub of the housing and has a cutting filament wound thereon and the free end of this filament is guided through an opening of the housing. In addition, the spool includes switching stops which are part of an indexing mechanism for permitting an incremental rotation of the spool relative to the housing for paying out incremental lengths of the cutting filament during operation of the cutterhead.

BACKGROUND OF THE INVENTION

A cutterhead of the kind described above includes a housing rotatable about a central axis and a spool is rotatably journalled in this housing. An adequate supply of cutting filament is wound on the spool. The free end of the cutting filament pulled off the spool is guided out of the housing through a housing opening. The portion of the filament disposed outside of the housing is subjected to centrifugal force and constitutes the rotating cutting element with which grass or other vegetation is cut.

The supply spool for the cutting filament is rotatably mounted in the housing and is provided with an indexing device which includes a blocking lever. The blocking lever is pivotally journalled in the housing and has a switching arm which coacts with switching stops of a switching disc or a slide so as to cause the blocking lever to move out of its blocking position with respect to the switching stops of the spool and into a outer position wherein the spool is released. The spool then rotates relative to the housing and a predetermined increment of wound cutting filament is released.

In the known embodiment, the filament taken off the spool is guided around the pivotable blocking lever such that a filament redirecting location is formed at a spacing from the axis of the blocking lever. The rotating cutting filament is subjected to centrifugal force and has a different magnitude dependent upon the cutting length thereof. For this reason, the filament redirecting location defines a point of application for the centripetal force which acts in a direction opposite to the centrifugal force acting on the blocking lever and tends to move the blocking lever inwardly into its blocked position. Since the mass of the indexing device is not changeable but only the mass of the free end of the cutting filament, the cutterhead described above will respond only to the mass of the free end of the cutting filament which, in turn, is directly a function of its length.

In the known configuration, the blocking lever is configured as a one-arm lever and has a free pivotable end lying opposite the bearing axis. On this end, the blocking lever has a section over which the cutting filament unwound from the spool is guided and thereby forms the redirecting location of the cutting filament on which a centripetal force acts in a direction opposite to the centrifugal force and this centripetal force tends to press the blocking lever inwardly into the blocking position with respect to the spool. This free pivotable end of the blocking lever together with its redirecting element for the filament conjointly defines a switching arm which coacts with the switching stops of the spool in such a manner that the switching arm blocks the spool against rotation in an inner position and releases the spool in an outer position.

It is a disadvantage of this cutterhead that its automatic readjustment is not always assured especially when the cutting filament is greatly worn down. This makes it necessary for the operator to perform the readjustment operation manually especially when the remainder of the cutting filament is very worn, that is, greatly shortened.

SUMMARY OF THE INVENTION

It is an object of the invention to provide a cutterhead of the kind described above wherein an operatively reliable automatic readjustment of the cutting filament is obtained even in marginal situations and to avoid an intervention by the operator, for example, by changing the rotational speed of the cutterhead.

The cutterhead of the invention is for a rotatably-driven vegetation cutter apparatus defining a drive axis about which the cutterhead is rotatably driven. The cutterhead includes: a housing adapted to be rotatably driven by the vegetation cutter apparatus about the axis; the housing having a hub formed thereon so as to extend along the axis; a spool carrying a flexible cutting filament wound thereon and being rotatably journalled on the hub; the housing having a pass-through opening formed therein for passing the cutting filament to the outside; indexing means for permitting an incremental rotation of the spool relative to the housing to pay out incremental lengths of the cutting filament, the indexing means including: a blocking lever pivotally journalled in the housing and having first and second lever arms, the first lever arm having a switching arm formed thereon and the second lever arm having redirecting means formed thereon for guiding the cutting filament over the blocking lever while defining a location at which a centripetal force is applied to the blocking lever by the filament; switching stop means for coacting with the switching arm; the blocking lever being mounted in the housing so as to be movable between a blocking position wherein the switching arm coacts in dependence upon centrifugal force with the switching stop means to prevent a rotational movement of the spool with respect to the housing and a release position wherein the switching arm coacts in dependence upon centrifugal force with the switching stop means to release the spool for movement relative to the housing to pay out an incremental length of the filament; and, the switching arm and the redirecting means being spaced at a peripheral distance from each other so as to cause the first lever arm to be longer than the second lever arm.

BRIEF DESCRIPTION OF THE DRAWINGS

The invention will now be described with reference to the drawings wherein:

FIG. 6 is a view corresponding to FIG. 5 but with the blocking lever shown in its outer position for blocking the spool; and, FIG. 7 is a section view taken along line VII—VII of FIG. 5.

DESCRIPTION OF THE PREFERRED EMBODIMENTS OF THE INVENTION

Figure 1:
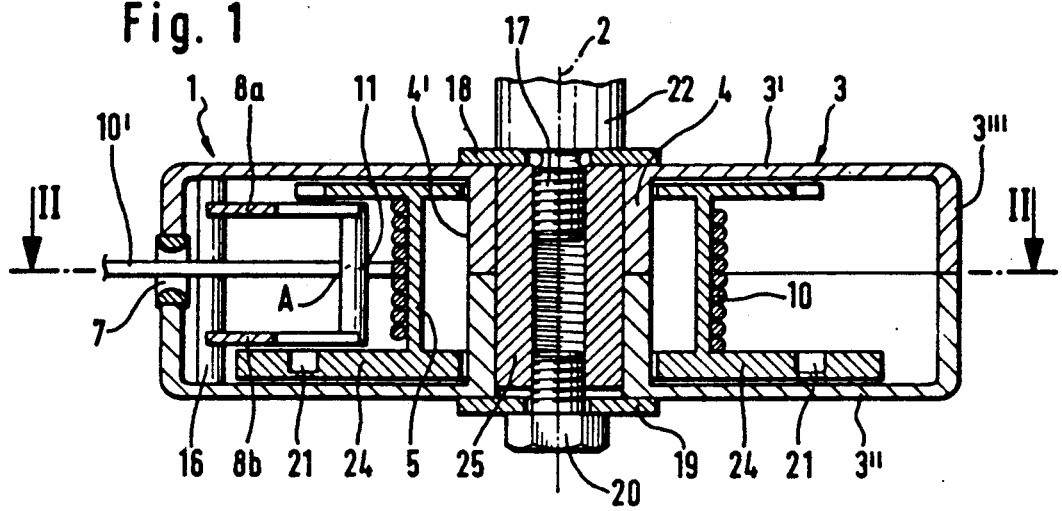
FIG. 1 is an axial section of an embodiment of the cutterhead according to the invention taken along line I—I of FIG. 2.

The cutterhead 1 belongs to a vegetation cutter apparatus not shown in the drawing and is used especially for cutting grasses or the like. The cutterhead is driven by a motor and rotates about the rotational axis identified by reference numeral 2 in FIG. 1. The cutterhead 1 has a pot-shaped housing 3 having a base wall 3' disposed on the drive side of the cutterhead and a lower base wall 3" with both base walls being connected by a peripheral wall 3" of the housing.

The lower base wall 3" can be threadably connected with the peripheral wall 3" for example, by a thread (not shown). A hub 4 is disposed centrally in the housing and can be formed as one piece with the housing base wall 3' or as shown, the hub 4 can be formed from two pieces juxtaposed at the center and formed on corresponding ones of the base walls (3' and 3").

In the embodiment of FIG. 1, the housing is shown partitioned at a plane containing the drive axis. The connection to the motor shaft 22 includes a threaded sleeve 25 having six flats and engaging the hub 4 in a form-tight manner. A threaded lug 17 of the shaft 22 threadably engages the sleeve 25. The sleeve 25 is fixed in the housing 3 by washers (18, 19) and a threaded bolt 20.

A spool 5 is rotatably journalled in the housing on the peripheral surface 4' of the hub 4 so that it can rotate relative to the housing when released by the blocking lever 8. A cutting filament 10 such as a perlon filament or the like is wound on the spool 5. The portion of the filament 10 pulled from the spool 5 is guided to the outside through an opening 7 of the housing 3 and defines the actual cutting end of the filament. The spool 5 is provided with switching cams or stops 6 which are arranged at the outer periphery and concentric to the spool 5. As shown in the drawing, the switching stops 6 are provided in the form of a slide guide 21 for a blocking lever 8. The arrow ω shows the rotational direction of the cutterhead during operation.

The blocking lever 8 is pivotally journalled about the axis 16 in the housing 3 and is biased by centrifugal force which acts thereupon. The blocking lever 8 is also subjected to an inwardly directed centripetal force because of the filament 10 which is guided thereon and this centripetal force also acts upon the filament 10. Finally, a reset force also acts on blocking lever 8 in the outer blocking position (see FIG. 2) and this reset force component is effective with a rotation of the switching stops 6, that is, with a rotation of the slide guide 21 of the switching disc 24.

The switching arm 9 coacts with the switching stops 6 in the form of the slide guide 21 formed in the switching disc 24. According to the invention, the switching arm 9 and the redirecting element 11 for the cutting filament 10 are arranged with a peripheral separation from each other such that the lever arm 12 of the switching arm 9 is longer than the lever arm 13 of the filament redirecting element 11. The filament is guided over the redirecting element 11 and the reset force is applied to the switching arm 9. As a consequence of the spatial separation of the redirecting element 11 of the lever 8 and the switching arm 9 (the switching disc 24 is provided with stops 6 in the form of slide guide 21), the points of application of the forces relative to the remaining parameters and the construction of the cutterhead in accordance with position, shape and size can be precisely aligned so that an exact match between the centrifugally-dependent forces and the reset forces acting when the spool is released can be obtained; that is, a match of the forces effecting the precise switching and constructive details can be obtained. This makes possible the precise guidance of the blocking lever 8 and especially its reliable automatic return in marginal situations and when the outwardly extending portion 10' of the cutting filament has been worn down so as to be extremely short. Intervention by the operator is thereby avoided.

As shown in the drawings, it is advantageous if the pivot axis 16 of the blocking lever 8 is provided in the vicinity of the pass-through opening 7. In the embodiments of FIGS. 1 to 4, the blocking lever 8 is configured as a two-arm lever such that the lever arm 13 is provided with the filament redirecting element 11 at the outer free end thereof. The redirecting element defines the point of application for the centripetal force $F_P$ whereas the other lever arm carries the actual switching arm 9. The switching arm 9 coacts with the switching stops 6 which in the embodiment shown are defined by a slide guide 21. The blocking lever 8 is preferably configured so as to be bifurcated and, as seen in plan view, the guide lever 8 is configured so that the shorter lever arm 13 having the redirecting element 11 defines an angle with the larger lever arm 12 with this angle lying between 65° and 120° C. and is preferably approximately 90° C. The apex of such an angularly-shaped blocking lever also defines its pivot axis 16 (see FIGS. 1 to 3).

Figures 5, 7:
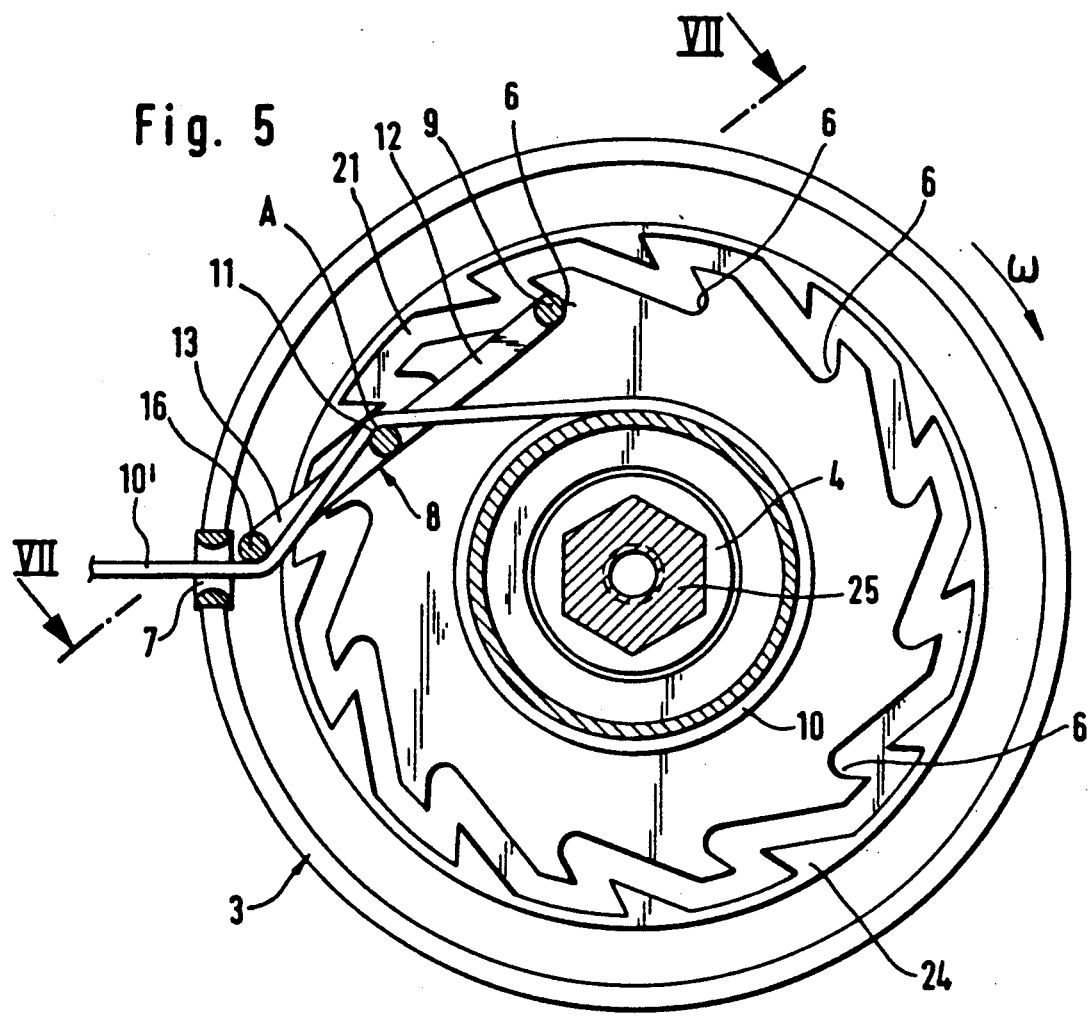
FIG. 5 is a section view corresponding to those of FIGS. 2 and 3 but showing another embodiment of the cutterhead of the invention which includes a one-arm blocking lever shown in the inner position for blocking the spool whereat the stops or stop cams are adapted to the one-arm embodiment of the blocking lever by being arranged to lie inwardly.

In the embodiments of FIGS. 5 to 7, the separation between the redirecting element 11 of the filament 10 and the switching arm 9 is obtained in that the lever arm 13 is extended by the lever arm 12 having the switching arm 9. The switching arm coacts with the stops defined by the slide guide 21 and the lever arm 13 includes the filament redirecting element 11. In this embodiment, the blocking lever 8 with its redirecting element 11 and its switching arm 9 is a one-arm lever. The redirecting element for the filament 10 and the switching arm 9 are both provided on this one lever with the reset force $F_R$ of switching stops 6 defined by the slide guide 24 being applied to the switching arm 9. The redirecting element 11 is at a shorter distance from the pivot axis 16 than the switching arm 9 as shown in FIG. 5.

FIG. 5 shows the switching arm 9 in the inner stop position against a switching stop 6 wherein the one-armed blocking lever 8 blocks the spool 5 against rotation. Here too, the rotational direction of the cutterhead 1 is identified by the arrow ω. FIG. 6 shows the release position wherein the blocking lever 8 with the switching arm 9 is disposed in the outer position, that is, in the reset position.

In the embodiment of FIGS. 5 to 7, the slide guide 21 of the one-arm embodiment of the blocking lever is correspondingly adapted in that the stop cams 6 are arranged to lie inwardly compared to the embodiment of FIGS. 1 to 4 where the stop cams lie outwardly. If the blocking lever 8 is configured in the form of an angle lever as in the embodiment of FIGS. 1 to 4, the center of gravity of the blocking lever 8 is preferably on the shorter lever arm 13 having the filament redirecting element 11.

In the embodiment of the angle lever corresponding to FIGS. 1 to 4 as well as in the one-arm extended embodiment corresponding to FIGS. 5 to 7, the blocking lever 8 can be configured as a bifurcated lever wherein the lever arms 13 and 12 comprise two parallel arms 8a and 8b one on top of the other (see FIG. 1).

Figure 2:
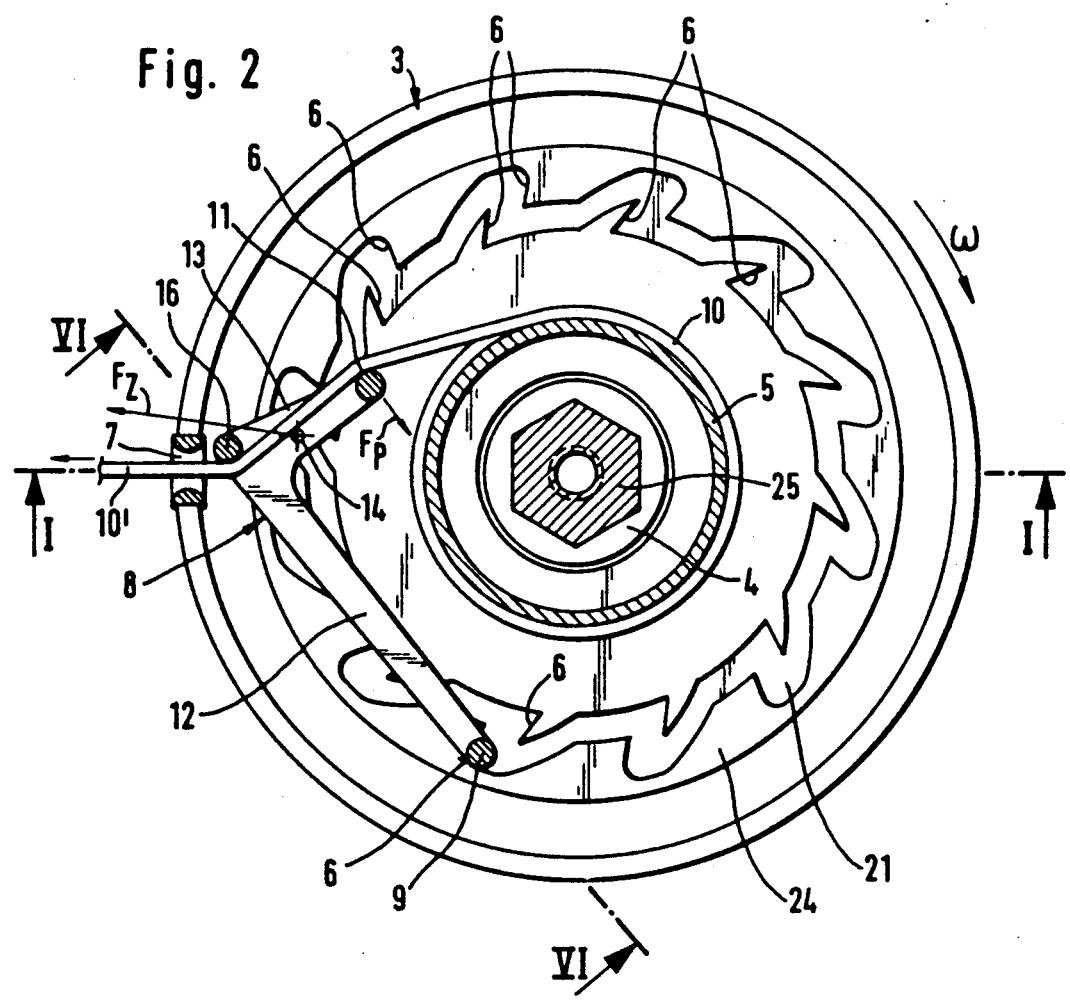
FIG. 2 is a horizontal section view taken along line II—II of FIG. 1 wherein the blocking lever is shown in an outer position for blocking the spool and for which the switching stops lie outwardly.
Figure 3:
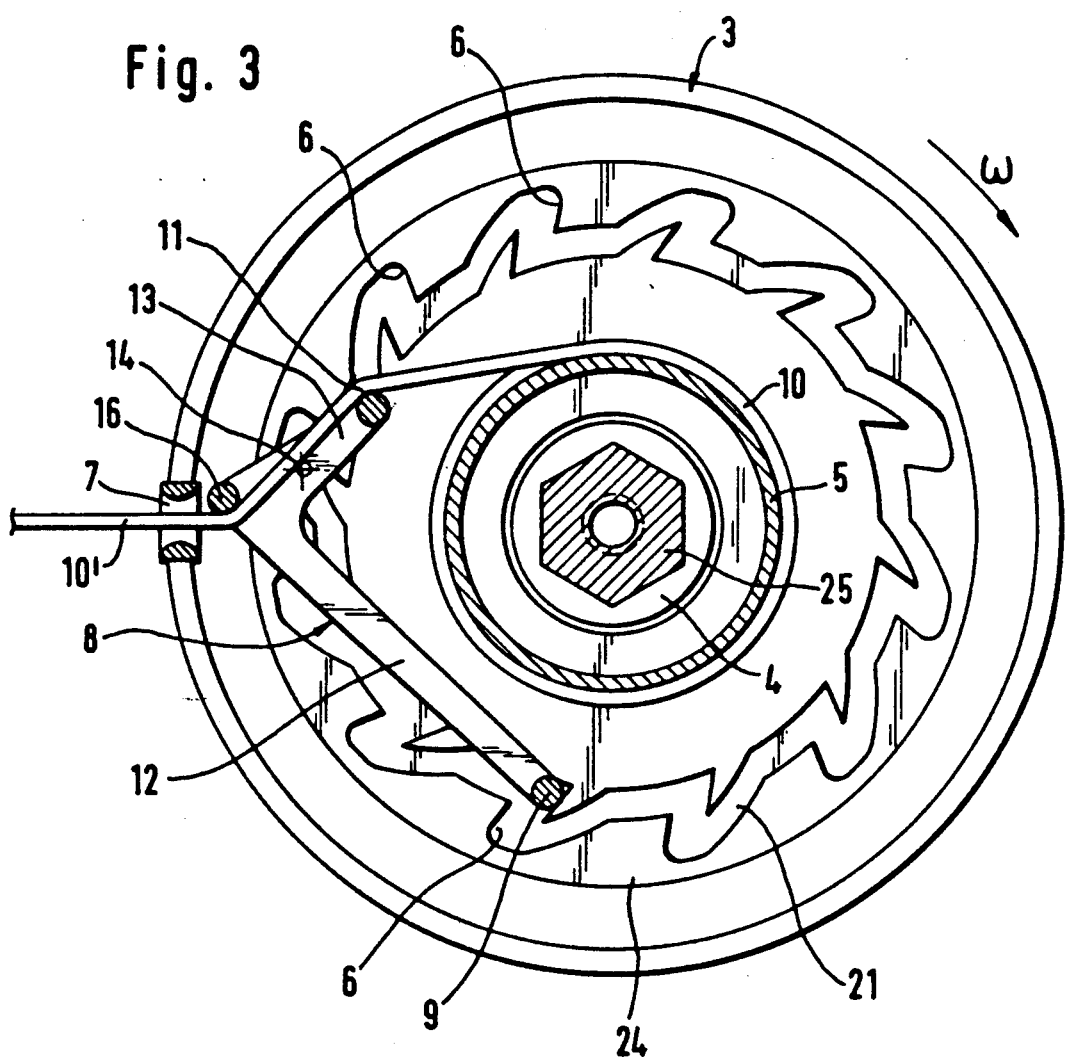
FIG. 3 is a section view corresponding to that shown in FIG. 2 but with the blocking lever in the inner position whereat the spool is released for paying out the cutting filament.
Figure 4:
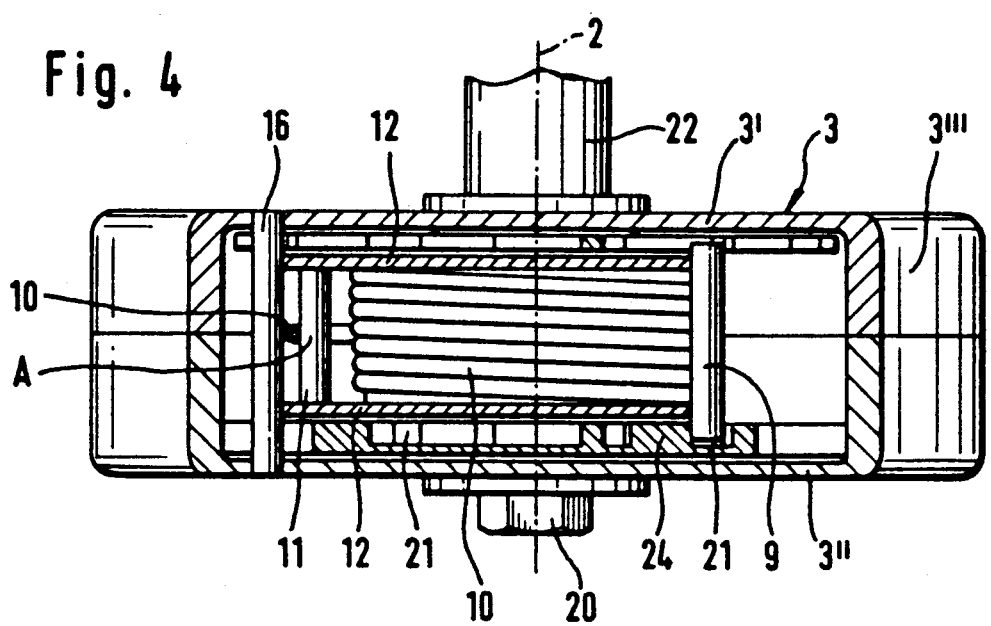
FIG. 4 is a section view of the cutterhead taken along line IV—IV of FIG. 2.

The acting forces of the indexing mechanism are shown schematically in FIGS. 2 and 6. The total centrifugal force acting on the blocking lever 8 is identified by $F_Z$ and is applied at the center of gravity 14 of the blocking lever. The centrifugal force acting on the filament (10, 10') pulls the filament outwardly and is identified by $F_F$. The centripetal force is identified by $F_P$ and results from the centrifugal force $F_Z$. The centripetal force $F_P$ tends to move the lever arm 13 with its redirecting element 11 inwardly. The reset force $F_R$ of the switching disc 24 acts on the switching arm 9 separately from this point of application for the filament force. This reset force $F_R$ again returns the switching arm 9 from its outer position into its inner position.

The center of gravity 14 of the blocking lever 8 is advantageously so positioned that the torque of the centrifugal force $F_Z$ is counter to the torque of the centripetal force $F_P$ with reference to the pivot axis 16. In the embodiment, the pivot axis 16 of the blocking lever 8 is provided in the vicinity of the outer wall 17 of the housing 3. Other arrangements of the pivot axis are also possible such as where the pivot axis is disposed below the switching disc 24.

It is understood that the foregoing description is that of the preferred embodiments of the invention and that various changes and modifications may be made thereto without departing from the spirit and scope of the invention as defined in the appended claims.

What is claimed is:

1. A cutterhead for a rotatably-driven vegetation cutter apparatus defining a drive axis about which the cutterhead is rotatably driven, the cutterhead comprising:

a housing adapted to be rotatably driven by the vegetation cutter apparatus about said axis;

said housing having a hub formed thereon so as to extend along said axis;

a spool carrying a flexible cutting filament wound thereon and being rotatably journalled on said hub;

said housing having a pass-through opening formed therein for passing the cutting filament to the outside;

indexing means for permitting an incremental rotation of said spool relative to said housing to pay out incremental lengths of the cutting filament, said indexing means including:

a blocking lever pivotally journalled in said housing and having first and second lever arms, said first lever arm having a switching arm formed thereon and said second lever arm having redirecting means formed thereon for guiding the cutting filament over said blocking lever while also defining a location at which a centripetal force is applied to said blocking lever by said filament;

said redirecting means defining an open rounded surface for freely guiding said filament thereon so as to cause said filament to change direction and apply said centripetal force to said blocking lever at said rounded surface;

switching stop means formed on said spool for coacting with said switching arm;

said blocking lever being mounted in said housing so as to be movable between a blocking position where said switching arm coacts in dependence upon centrifugal force with said switching stop means to prevent a rotational movement of said spool with respect to said housing and a release position wherein said switching arm coacts in dependence upon centrifugal force with said switching stop means to release said spool for movement relative to said housing to pay out an incremental length of the filament; and, said switching arm and said redirecting means being spaced at a peripheral distance from each other so as to cause said first lever arm to be longer than said second lever arm.

2. The cutterhead of claim 1, said housing having upper and lower walls and a peripheral wall connecting said upper and lower walls; and, said indexing means including pivot means for pivotally mounting said blocking lever in said housing; and, said pivot means being disposed in said housing so as to define a pivot axis in the region of said peripheral wall.

3. The cutterhead of claim 2, said first and second lever arms conjointly defining a one-arm lever including said redirecting means and said switching arm; and, said switching arm being disposed in spaced relationship to said redirecting means.

4. The cutterhead of claim 2, said blocking lever being a two-arm lever wherein said first and second arms are separate from each other.

5. The cutterhead of claim 4, said two-arm lever being bifurcated and said pivot means being disposed in said housing so as to place said pivot axis in the vicinity of said pass-through opening.

6. The cutterhead of claim 4, said blocking lever having an angular configuration so as to cause said first and said second lever arms to conjointly define an angle between 65° to 120° C.; said first and second lever arms being joined to conjointly define an apex; said blocking lever being pivotally mounted on said pivot means at said apex; and, said first lever arm being longer than said second lever arm.

7. The cutterhead of claim 6, said angle being approximately 90° C.

8. The cutterhead of claim 1, said spool including a disc and said switching stop means being formed on said disc.

9. A cutterhead for a rotatably-driven vegetation cutter apparatus defining a drive axis about which the cutterhead is rotatably driven, the cutterhead comprising:

a housing adapted to be rotatably driven by the vegetation cutter apparatus about said axis;

said housing having a hub formed thereon so as to extend along said axis;

a spool carrying a flexible cutting filament wound thereon and being rotatably journalled on said hub;

said housing having a pass-through opening formed therein for passing the cutting filament to the outside;

indexing means for permitting an incremental rotation of said spool relative to said housing to pay out incremental lengths of the cutting filament, said indexing means including:

a blocking lever pivotally journalled in said housing and having first and second lever arms, said first lever arm having a switching arm formed thereon and said second lever arm having redirecting means formed thereon for guiding the cutting filament over said blocking lever while defining a location at which a centripetal force is applied to said blocking lever by said filament;

switching stop means disposed in said housing for coacting with said switching arm;

said blocking lever being mounted in said housing so as to be movable between a blocking position wherein said switching arm coacts in dependence upon centrifugal force with said switching stop means to prevent a rotational movement of said spool with respect to said housing and a release position wherein said switching arm coacts in dependence upon centrifugal force with said switching stop means to release said spool for movement relative to said housing to pay out an incremental length of the filament;

said switching arm and said redirecting means being spaced at a peripheral distance from each other so as to cause said first lever arm to be longer than said second lever arm;

said housing having upper and lower walls and a peripheral wall connecting said upper and lower walls; and, said indexing means including pivot means for pivotally mounting said blocking lever in said housing; and, said pivot means being disposed in said housing so as to define a pivot axis in the region of said peripheral wall;

said blocking lever being a two-arm lever wherein said first and second arms are separate from each other;

said blocking lever having an angular configuration so as to cause said first and said second lever arms to conjointly define an angle between 65° to 120° C.; said first and second lever arms being joined to conjointly define an apex; said blocking lever being pivotally mounted on said pivot means at said apex; and, said first lever arm being longer than said second lever arm; and, said switching stop means including a slide guide formed in said disc so as to define a plurality of switching cams for coacting with said switching arm.

10. The cutterhead of claim 9, said angle being approximately 90° C.

* * * * *

UNITED STATES PATENT AND TRADEMARK OFFICE
CERTIFICATE OF CORRECTION

PATENT NO. : 5,010,649

DATED : April 30, 1991

INVENTOR(S) : Joachim Hoffmann

It is certified that error appears in the above-identified patent and that said Letters Patent is hereby corrected as shown below:

In column 1, line 36: delete "a" and substitute -- an -- therefor.

In column 3, line 28: delete "3''" and substitute -- 3''' -- therefor.

In column 3, line 30: delete "3''" and substitute -- 3''' -- therefor.

In column 4, line 44: delete "120°C" and substitute -- 120° -- therefor.

In column 4, line 45: delete "90°C" and substitute -- 90° -- therefor.

In column 6, line 14: delete "where" and substitute -- wherein -- therefor.

In column 6, line 49: delete "120°C" and substitute -- 120° -- therefor.

UNITED STATES PATENT AND TRADEMARK OFFICE
CERTIFICATE OF CORRECTION

PATENT NO. : 5,010,649
DATED : April 30, 1991
INVENTOR(S) : Joachim Hoffmann

Page 2 of 2

It is certified that error appears in the above-identified patent and that said Letters Patent is hereby corrected as shown below:

In column 6, line 55: delete "90°C" and substitute -- 90° -- therefor.

In column 8, lines 17 and 18: delete "120°C" and substitute -- 120° -- therefor.

In column 8, line 28: delete "90°C" and substitute -- 90° -- therefor.

Signed and Sealed this

Twenty-third Day of February, 1993

*Attest:*

STEPHEN G. KUNIN

*Attesting Officer*    *Acting Commissioner of Patents and Trademarks*